United States Patent [19]

Cunningham

[11] Patent Number: 4,655,500
[45] Date of Patent: Apr. 7, 1987

[54] OPENING ROOF FOR MOTOR VEHICLES

[75] Inventor: Douglas J. Cunningham, Portsmouth, United Kingdom

[73] Assignee: Britax Weathershields Limited, Birmingham, United Kingdom

[21] Appl. No.: 795,095

[22] Filed: Nov. 5, 1985

[30] Foreign Application Priority Data

Nov. 30, 1984 [GB] United Kingdom ............... 8430292

[51] Int. Cl.$^4$ .......................... B60J 7/057; B60J 7/05
[52] U.S. Cl. ................................ 296/223; 276/221
[58] Field of Search ............... 296/216, 220, 221–224, 296/218

[56] References Cited

U.S. PATENT DOCUMENTS

| Re. 28,346 | 2/1975 | Kouth et al. | 296/221 |
| 4,179,156 | 12/1979 | Huisman | 296/216 |
| 4,403,805 | 9/1983 | Strem, Jr. et al. | 296/221 |

FOREIGN PATENT DOCUMENTS 3045364  7/1982  Fed. Rep. of Germany ...... 296/223

Primary Examiner—Robert B. Reeves
Assistant Examiner—Dennis H. Pedder
Attorney, Agent, or Firm—Hayes, Davis & Soloway

[57] ABSTRACT

An opening roof assembly for a motor vehicle comprises a rigid panel adapted to close an opening in a vehicle roof, respective guide tracks arranged to be secured to the vehicle roof on each side of the opening below the level of the vehicle roof, and respective support assembly for each side of the panel. Each support assembly comprises a first support member having thereon a cam surface of arcuate shape with its concave side upwards and its front end lower than its rear end, a second support member having a cam follower retained in engagement with the cam surface, one of the support members being slidably mounted on the corresponding guide track and the other support member being secured to the underside of the panel. Relative movement between the two support members thus causes the first support member to pivot relative to the second support member to raise the rear edge of the panel.

8 Claims, 9 Drawing Figures

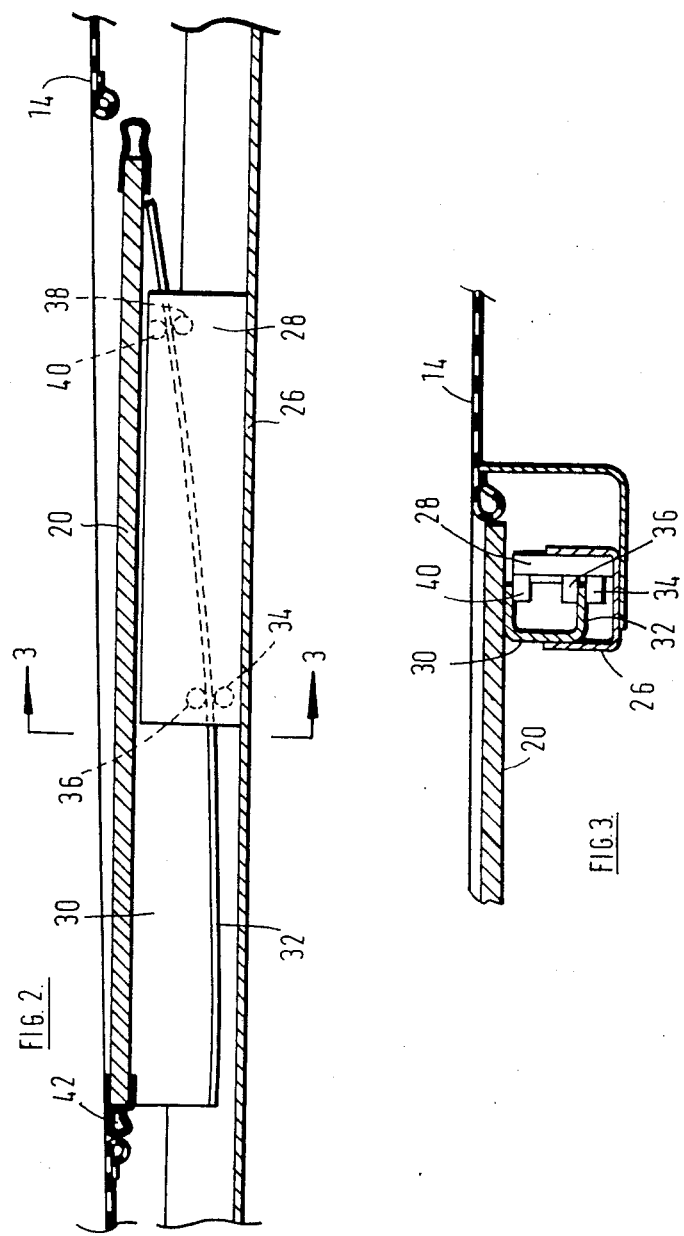

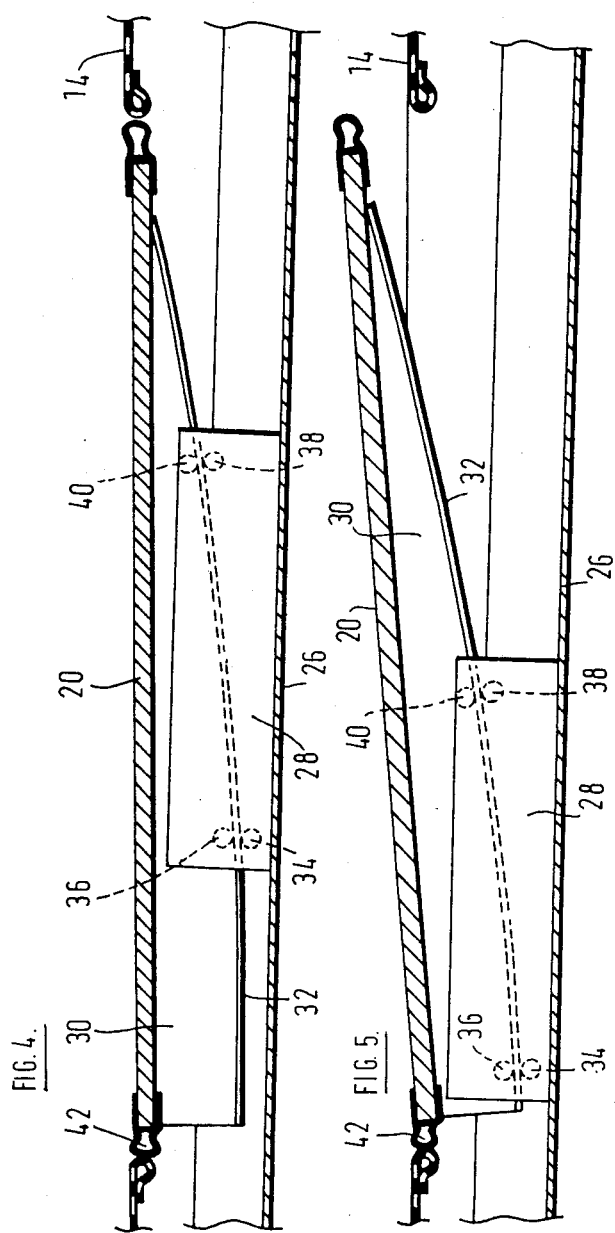

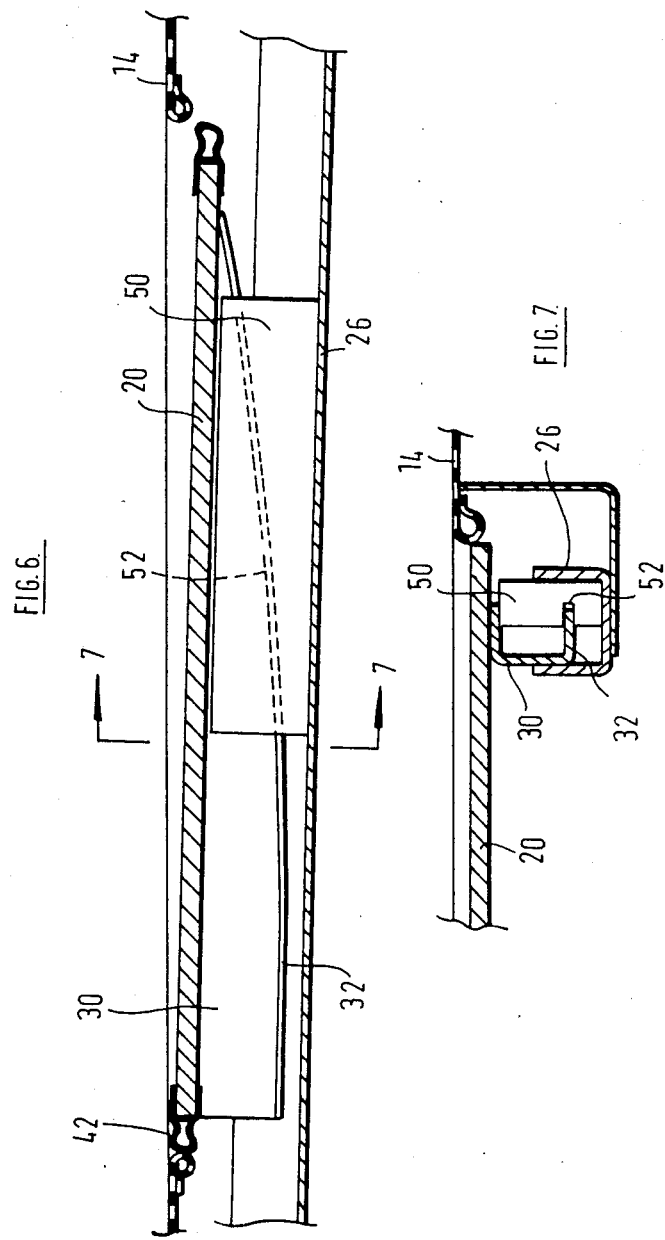

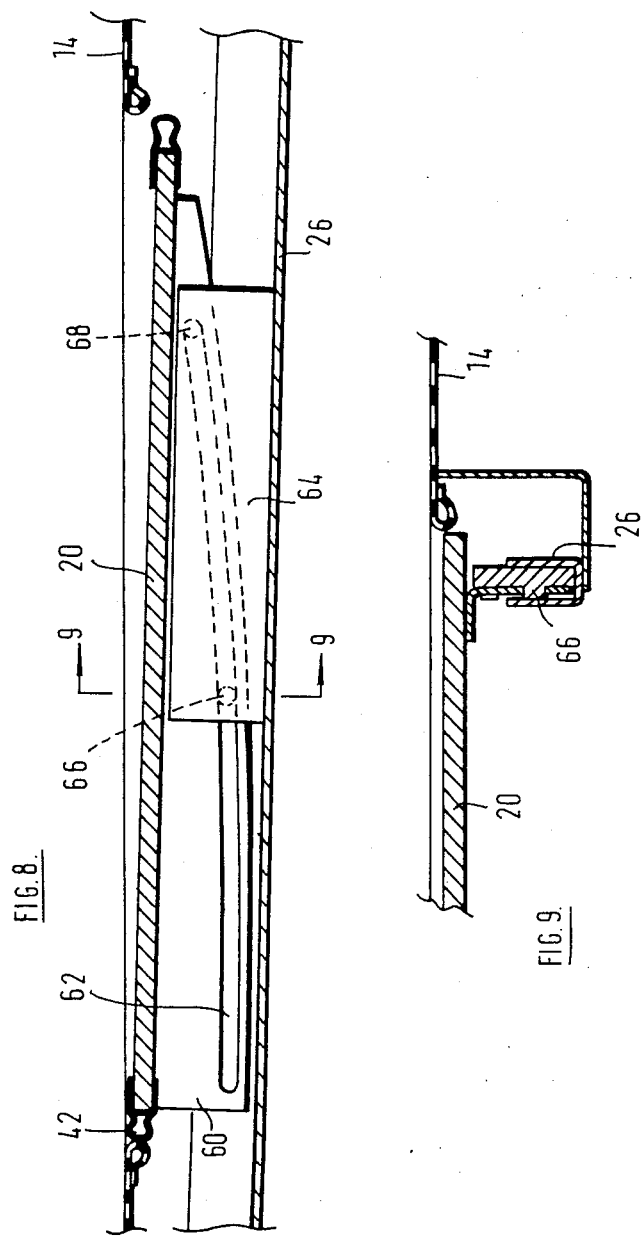

OPENING ROOF FOR MOTOR VEHICLES

This invention relates to an opening roof assembly for a motor vehicle of the type having a rigid panel closing an opening in the vehicle roof and which can be opened by pivoting the panel upwardly about a transverse horizontal axis adjacent to its front edge so that the rear edge of the panel is above the vehicle roof. The panel is supported at each side on respective guide rails extending along each side of the opening in the vehicle roof. The invention can be applied to a roof of this type which can also be opened by sliding the panel rearwardly below the vehicle roof behind the opening.

According to the invention, an opening roof assembly for a motor vehicle comprises a rigid panel adapted to close an opening in a vehicle roof, respective guide tracks arranged to be secured to the vehicle roof on each side of the opening below the level of the vehicle roof, and respective support means for each side of the panel, each support means comprising a first support member having thereon a cam surface of arcuate shape with its concave side upwards and its front end lower than its rear end, a second support member having cam follower means engaging with the cam surface, and coupling means for retaining the cam follower means in engagement with the cam surface, one of the support members being slidably mounted on the corresponding guide track and the other support member being secured to the underside of the panel, whereby relative movement between the two support members causes the first support member to pivot relative to the second support member to raise the rear edge of the panel.

Preferably, the arcuate shape is circular.

When the invention is to be applied to a roof which can also be opened by sliding the panel rearwardly below the vehicle roof behind the opening, the guide tracks extend below the vehicle roof behind the opening so that the roof can be opened in this way by simultaneous movement of the two support members along the track.

In one form of the invention, the cam surface comprises one side of a flange and the coupling means comprises second cam follower means on the second support member adapted to engage with the other side of the flange. The first and second cam follower means may comprise at least two abutment members engaging with one side of the flange and at least one abutment member engaging with the other side of the flange. Alternatively, if the arc forming the cam surface is circular, the first and second cam follower means may comprise respective side walls of an arcuate groove of the same radius as that of the cam surface.

In another form of the invention, the cam surface comprises one wall of a slot in the first support member, the opposite wall of the slot forming the coupling means and the cam follower means comprising two spaced projections on the second support member engaging in the slot.

Embodiments of the invention will now be described, by way of example, with reference to the accompanying drawings, in which:

FIG. 2 is a longitudinal sectional view of an opening roof assembly, of the kind shown in FIG. 1, in accordance with a first embodiment of the invention, with the rear edge of the panel lowered prior to sliding below the vehicle roof;

FIG. 3 is a cross-sectional view taken on the line 3—3 in FIG. 2;

FIG. 4 is a cross-sectional view, similar to FIG. 2 but with the panel closed;

FIG. 5 is a cross-sectional view, similar to FIG. 2 but with the rear edge of the panel raised;

FIG. 6 is a longitudinal sectional view, similar to FIG. 2, of an opening roof assembly in accordance with a second embodiment of the invention;

FIG. 7 is a cross-sectional view taken on the line 7—7 in FIG. 6;

FIG. 8 is a longitudinal sectional view, similar to FIG. 2, of an opening roof assembly in accordance with a third embodiment of the invention; and FIG. 9 is a cross-sectional view taken on the line 9—9 in FIG. 8.

Figure 1:
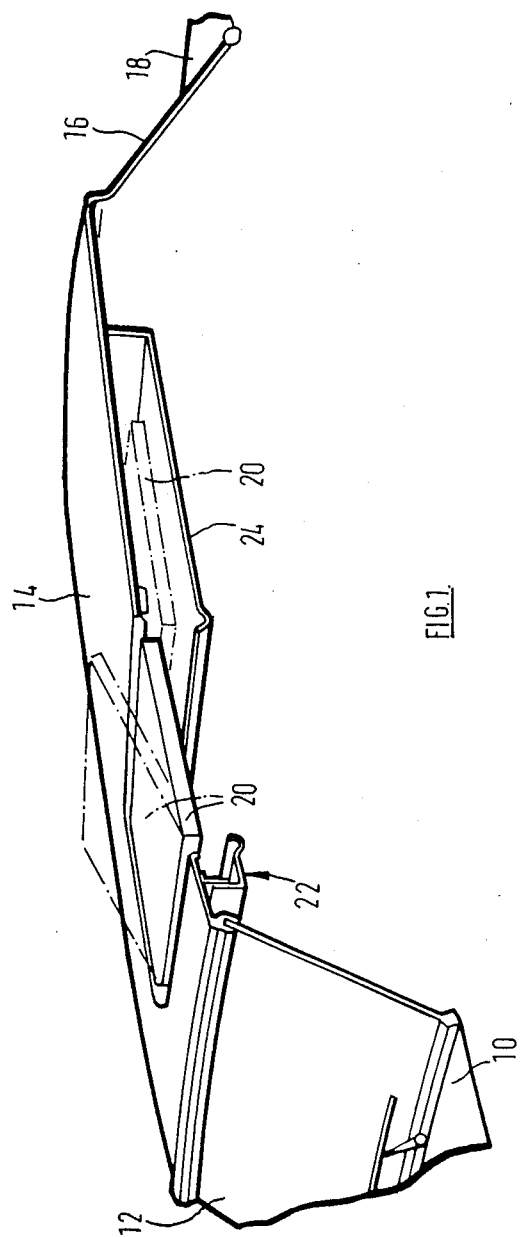
FIG. 1 is a fragmentary perspective sectional view of a motor car fitted with an opening roof assembly of the first kind to which the invention relates, showing the panel in its closed position and each of its two alternative open poitions.

FIG. 1 shows the upper part of the body of a saloon motor car comprising a bonnet 10, a windscreen 12, a roof 14, a rear window 16 and a boot 18. A movable glass roof panel 20 is located in a frame 22 bounding an opening in the vehicle roof. The frame 22 includes a drain tray 24 forming the bottom of a chamber into which the roof panel 20 can be slid below the vehicle roof 14.

A respective guide track, on which the panel 20 is slidable, extends along each side of the opening in the vehicle roof 14 and into the space above the drain tray 24. FIGS. 2 and 3 show the track 26 on the car driver's right-hand side of the opening in the vehicle roof 14, in longitudinal cross-section. A guide shoe 28 is mounted in the track 26 and drive means (not shown) are provided for moving it along the track 26 in synchronism with the corresponding guide shoe in the track on the other side of the opening in the vehicle roof 14.

A support member 30 is secured to the underside of the panel 20 so as to project downwardly, adjacent to the guide shoe 28. The support member 30 extends along substantially the whole of the corresponding side of the panel 20 and has a laterally projecting flange 32 on its bottom edge. The flange 32 is of part-cylindrical shape, the cylinder axis being located parallel to and above the front edge of the panel 20. The flange thereby forms a cam surface with concave side upwards and a front end lower than a rear end. A first pair of rollers 34, 36 is mounted on the guide shoe 28 near its front end. A second pair of rollers 38, 40 is mounted on the guide shoe 28 near its rear end. The lower rollers 34, 38 of each pair engage with the lower surface of the flange 32 and serve to support the panel 20. The upper rollers 36 and 40 engage with the upper surface of the flange 32, thus serving as coupling means to maintain the lower rollers 34 and 38 in engagement with the lower surface thereof.

FIG. 2 shows the rear edge of the panel 20 below the level of the vehicle roof 14. The shoe 28 is in its rearmost position relative to the support member 30, with the upper roller 40 abutting the underside of the panel 20. Rearward movement of the shoe 28 from this position causes the panel 20 to slide below the vehicle roof 14 behind the opening therein.

If the panel 20 is then returned to the position shown in FIG. 2 by sliding the shoe 28 forwardly, a seal 42 on the front edge of the panel 20 comes into abutment with the front edge of the roof opening, preventing further forward movement of the panel 20 and the support member 30. Continued forward movement of the shoe 28 causes the rollers 34, 36, 38 and 40 thereon to move along the flange 32, thereby raising the rear edge of the panel 20 to the level of the vehicle roof 14 so as to close the opening therein, as shown in FIG. 4. If forward movement of the shoe 28 continues, the rear edge of the panel 20 is raised above the level of the vehicle roof, as shown in FIG. 5.

FIGS. 6 and 7 illustrate an alternative embodiment of the invention in which the shoe 28 of FIGS. 2 to 5 is replaced by a shoe 50 having an arcuate slot 52 in the side wall facing the support member 30. The slot 52 is of the same radius as the flange 32, its upper wall replacing the upper rollers 36 and 40 and its lower wall replacing the lower rollers 34 and 38.

FIGS. 8 and 9 illustrate a further embodiment of the invention in which both the shoe and the support member differ from those described above. A support member 60, which is secured to the panel in the same position as the support member 30 of FIGS. 2 to 7, has an arcuate slot 62 therein of the same curvature as that of the flange 32. The upper surface of slot 62 therefore acts, in this embodiment, as a cam surface and the lower surface as coupling means to retain the cam followers 66, 68 in the slot. A shoe 64, which is slidably mounted in the track 26, carries front and rear pegs 66 and 68 which engage in the slot 62.

Both the embodiment of FIGS. 6 and 7 and the embodiment of FIGS. 8 and 9 operate in a similar manner to that described above with reference to FIGS. 2 to 5.

In any of the embodiments of the invention, known interlock arrangements, for example as described in U.S. Pat. No. Re 28,346, may be provided to ensure that the panel 20 is not raised from its lowest position unless it is aligned with the opening in the vehicle roof, and it is not moved rearwardly from alignment with the opening unless it is fully lowered.

I claim:

1. An opening roof assembly for a motor vehicle comprising a rigid panel adapted to close an opening in a vehicle roof, a guide track fast with the vehicle roof on a side of the opening below the level of the vehicle roof, and support means comprising a first support member having thereon a cam surface of arcuate shape having a concave side upwards and a front end lower than a rear end, a second support member having cam follower means engaging with the cam surface, the cam follower means fixably positioned relative to a longitudinal dimension of the second support member, and coupling means for retaining the cam follower means in engagement with the cam surface, one of the support members being slidably mounted on the guide track for rectilinear translational movement relative thereto, and the other support member being fast with the underside of the panel, whereby relative movement between the two support members causes the first support member to pivot relative to the second support member to raise the rear edge of the panel.

2. An opening roof assembly according to claim 1, wherein said arcuate shape is part-circular.

3. An opening roof assembly for a motor vehicle comprising a rigid panel adapted to close an opening in a vehicle roof, a guide track fast with the vehicle roof on a side of the opening below the level of the vehicle roof, and support means comprising a first support member having thereon a flange of arcuate shape having a concave side upwards and a front end lower than a rear end, a second support member having first cam follower means engaging with a first side of the flange and second cam follower means engaging with a second side of the flange to retain the first cam follower means in engagement with the first side of the flange, one of the support members being slidably mounted on the corresponding guide track and the other support member being fast with the underside of the panel, whereby relative moevement between the two support members causes the first support member to pivot relative to the second support member to raise the rear edge of the panel.

4. An opening roof assembly according to claim 3, wherein the guide track extends below the vehicle roof behind the opening, so that simultaneous rearward movement of the two support members along the track causes the roof to be opened by sliding the panel rearwardly below the vehicle roof behind the opening.

5. An opening roof assembly according to claim 3, wherein the first and second cam follower means together comprise at least two abutment members engaging with one side of the flange and at least one abutment member engaging with the other side of the flange.

6. An opening roof assembly according to claim 3, wherein said arcuate shape is part-circular.

7. An opening roof assembly according to claim 6, wherein the first and second cam follower means comprise respective walls of an arcuate groove of the same radius as that of the flange.

8. An opening roof assembly according to claim 1, wherein the cam surface comprises one wall of a slot in the first support member, an opposite wall of the slot forms the coupling means and the cam follower means comprises two spaced projections on the second support member engaging in the slot.

* * * * *